May 7, 1963 L. J. MINTZ ETAL 3,089,127

MAGNETIC SHIFT REGISTER

Filed Sept. 9, 1958 4 Sheets-Sheet 1

INVENTORS.
LEON J. MINTZ
ROLAND YII
BY Eli Weiss

INVENTORS.
LEON J. MINTZ
ROLAND YII
BY Eli Weiss

MAGNETIC SHIFT REGISTER

Filed Sept. 9, 1958 4 Sheets-Sheet 3

INVENTORS.
LEON J. MINTZ
ROLAND YII
BY Eli Weiss

MAGNETIC SHIFT REGISTER

Filed Sept. 9, 1958

INVENTORS.
LEON J. MINTZ
ROLAND YII
BY Eli Weiss

United States Patent Office
3,089,127
Patented May 7, 1963

3,089,127
MAGNETIC SHIFT REGISTER

Leon J. Mintz, Brooklyn, N.Y., and Roland Yii, West Chester, Pa., assignors to Burroughs Corporation, Detroit, Mich., a corporation of Michigan Filed Sept. 9, 1958, Ser. No. 759,938
10 Claims. (Cl. 340—174)

This invention relates generally to a magnetic shift register and more particularly to an improved magnetic shift register that can be conditioned selectively to advance information along a forward or a reverse path and incorporates improved input and output networks.

Shift registers are frequently employed in data processing equipment to facilitate the handling of information. Presently, shift registers that can step or advance information along a fixed path require separate windings for each distinctive operation performed. Difficulties arise, however, when an attempt is made to provide a shift register that can selectively advance desired information in a forward or reverse direction.

It is an object of this invention to provide an improved magnetic core shift register that can selectively advance information in a forward or reverse direction along a particular path.

It is another object of this invention to provide an improved read-in network for a magnetic core shift register.

It is still another object of this invention to provide an improved read-out network for a magnetic core shift register.

It is an additional object of this invention to provide an improved magnetic core shift register that can operate on small amounts of power.

It is also an object of this invention to provide an improved magnetic core shift register that is reliable in operation and economical to use.

Other objects and many of the attendant advantages of this invention will be readily appreciated as the apparatus becomes better understood by reference to the following detailed description when considered in connection with the accompanying drawings wherein.

Briefly, by driving a magnetic core of a shift register into a state of saturation along a positive or a negative direction it can be conditioned to assume either a first magnetic state or a second magnetic state. One magnetic state is utilized to indicate the presence of information commonly referred to as a "1," while the other magnetic state is utilized to indicate the presence of information commonly referred to as a "0."

This invention is a one core per bit bidirectional shift register having capacitor storage and transistor shifting.

A magnetic core assemblage is interposed between a first capacitor and a second capacitor. Switching means selectively completes the electrical circuit between the magnetic core assemblage and the first or second capacitor. When the magnetic core is switched from one magnetic state to another the switching means will permit only one of the capacitors to receive a charge. If it is assumed that the first capacitor is positioned to the left of the magnetic core assemblage, and that the second capacitor is positioned to the right of the magnetic core assemblage, then the selective operation of the switching means will permit only the left or right capacitor to receive a charge. The charged capacitor is then discharged through the next appearing magnetic core assemblage. In this manner information can be reversibly advanced along a desired path.

To facilitate the insertion and detection of "1's" and "0's" in the magnetic cores, this invention utilizes an improved read-in network, and an improved read-out network.

The read-in network utilizes a switching means such as a transistor to selectively feed a pulse signal to a winding on a magnetic core to drive the core from a "0" state to a "1" state.

A special read-in winding is not required. The read-in network can be coupled to feed a signal to an existing winding on a core. In this manner, not only is a read-in winding eliminated, but if the read-in network is coupled to a winding of each core, then each core of a row of cores can be set to indicate a "0" or "1" condition independently of all of the other cores.

The read-out network utilizes a blocking oscillator coupled to, and activated by a winding on one of the cores. A special read-out winding is not required. The read-out network can be coupled to sense information from either the read-in or read-out winding on a desired core. Thus, not only is a read-out winding that is normally required eliminated, but if a read-out network is coupled to a winding of each core, then information in each core of a row of cores can be detected independently of the operation of the other read-out networks.

Figure 1:
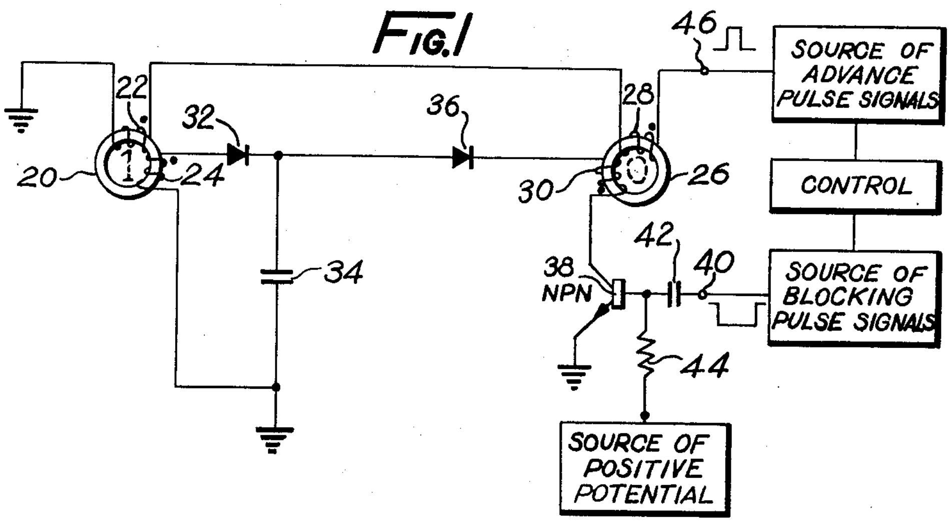
FIG. 1 is a schematic diagram of the basic forward shift circuit in accordance with the principles of this invention.

With reference to FIG. 1, there is illustrated a schematic diagram of the basic forward shift network in accordance with the principles of this invention. A first magnetic core 20 supports an advance winding 22 and a read winding 24; and a second magnetic core 26 supports an advance winding 28 and a read winding 30. A series combination of a selective blocking means such as a diode 32 and an electrical storage means such as a capacitor 34 are connected across the winding 24, and another selective blocking means such as a diode 36 is connected between the point common to the diode 32 and the capacitor 34, and one end of the winding 30. The other end of the winding 30 is connected to the collector terminal of an NPN transistor 38. The emitter terminal of the transistor 38 is connected to a ground terminal, and the base terminal is connected to an input terminal 40 through a capacitor 42. A source of positive potential is fed to the base terminal of the transistor 38 through a resistor 44. The transistor can be considered as a switching means. The end of the read winding 24 which is connected to the capacitor 34 is also connected to a ground terminal. The advance windings 22 and 28 are connected together and interposed between an input terminal 46, and a ground terminal.

A source of advance pulse signals is coupled to the input terminal 46, and a source of blocking pulse signals is coupled to the input terminal 40.

The hysteresis loop of the magnetic core utilized in this invention is substantially rectangular in shape, and the magnetic cores can be made of ferrites, magnetic tapes, or the like.

The heat treatment of the cores can vary in accordance with the properties desired. In addition to the wide variety of materials available, the cores utilized can have any one of a number of different geometrical shapes or configurations.

In the drawings, the dot representation is utilized to represent the direction of the coil windings by indicating like polarities of associated coils at any particular instant. Thus, referring to FIG. 1, the polarity of the upper end of the winding 24 will always be identical with the polarity of the right hand end of the winding 22.

The basic circuit in accordance with the principles of this invention illustrated schematically in FIG. 1 can shift or advance desired information from left to right only. In the description of its operation, it shall be assumed that the core 20 has been conditioned to indicate the presence of a "1," and that the core 26 has been conditioned to indicate the presence of a "0."

To advance the "1" from core 20 to core 26 an advance pulse signal is fed to terminal 46 from the source of advance pulse signals, and a blocking pulse signal is fed to terminal 40 from the source of blocking pulse signals. The advance pulse signal is a constant current pulse signal which has sufficient amplitude and duration to switch the cores. The blocking pulse signal is a constant voltage pulse signal which has an amplitude sufficient to cut off the transistor 38.

The blocking pulse signal has a time duration slightly longer than the time duration of the advance pulse, and the time occurrence of the two pulse signals are synchronized to permit the shorter advance pulse signal to occur in its entirety only during the occurrence of the longer blocking pulse signal.

The advance pulse signal drives the cores to a "0" state. Therefore, upon application of the advance pulse signal, core 20 is driven to the "0" state while core 26 is not affected. The blocking pulse signal brackets the advance pulse signal and cuts off the transistor 38 to inhibit the passage of signals through the read winding 30 by presenting a discontinuous electrical path. The voltage induced across the read winding 24, when the core 20 is driven from the "1" state to the "0" state, forwardly biases the diode 32 and charges the capacitor 34. The capacitor continues to charge until the core 20 is switched completely. Immediately after the core is switched to "0," the voltage induced across the winding 24 drops and the diode 32 is biased in a reverse direction to prevent the charge on the capacitor from leaking off through the winding 24. As long as the transistor 38 is cut off, the charge stored on the capacitor 34 cannot leak off.

Upon termination of the blocking pulse signal, which occurs after termination of the advance pulse signal, the positive potential fed to the base terminal of the transistor 38 from the source of positive potential saturates the transistor. During saturation, the collector potential is substantially at ground level and the capacitor 34 discharges through the winding 30 of core 26 to switch core 26 to indicate the presence of a "1." At this instant the shifting of the "1" from core 20 to 26 has been completed.

After the capacitor 34 discharges completely through the winding 30 and transistor 38, the transistor loses its collector bias and functions simply as two diodes connected in parallel.

The source of positive potential continues to feed current to the base terminal of the transistor. However, practical no current can flow out of the collector terminal as the diode 36 blocks the flow of reverse current through the read winding 30. Therefore, only the emitter junction can conduct normally when a pulse signal is not applied to the circuit.

Thus, the advance or shift pulse signal drives the core 20 from a "1" to a "0" state to charge the capacitor 34 while the transistor 38 is cut off by the presence of a blocking pulse signal which electrically disconnects the read winding 30 from the ground terminal. The diode 32 prevents the capacitor 34 from becoming charged to the reverse polarity if the core 20 is switched from "0" to "1," and also prevents a potential stored in the capacitor 34 from switching core 20 from "0" to "1" after termination of the advance pulse signal. If a "1" had been stored in core 26 prior to the arrival of the advance pulse signal, the small time delay required for the capacitor 34 to charge would allow the advance pulse signal to drive core 26 to a "0" state.

Figure 2:
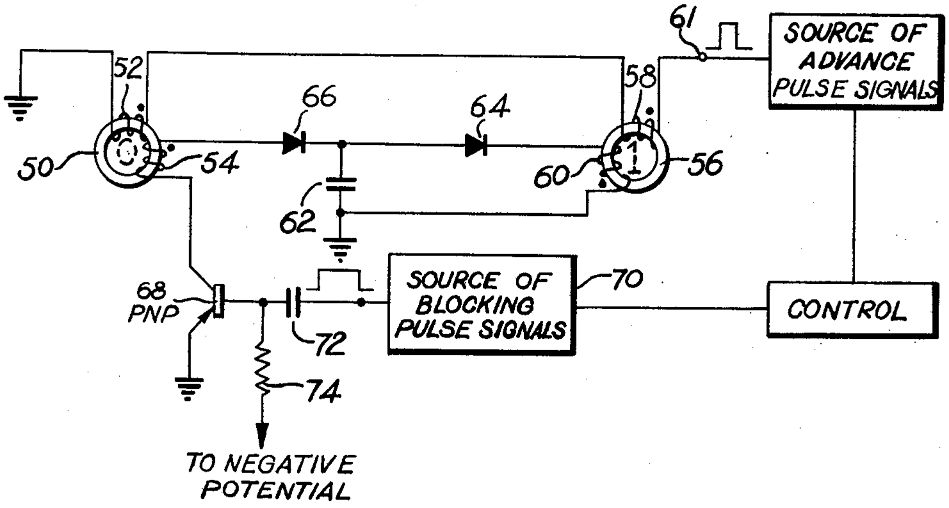
FIG. 2 is a schematic diagram of the basic reverse shift circuit in accordance with the principles of this invention.

With reference to FIG. 2, there is illustrated a schematic diagram of the basic reverse shift network in accordance with the principles of this invention. A first magnetic core 50 supports an advance winding 52 and a read winding 54. Another magnetic core 56 supports an advance winding 58 and a read winding 60. The two advance windings 52 and 58 are connected together in series and are interposed between an input terminal 61 and a ground terminal. A source of advance pulse signals is connected to the input terminal 61.

A series combination of an electrical storage means such as a capacitor 62, and a selective blocking means such as a diode 64 is connected across the winding 60, and the point common to the capacitor 62 and the winding 60 is connected to a ground terminal. The other terminal of the capacitor 62 is coupled to one end of the winding 54 through another selective blocking means such as a diode 66. The other terminal of the winding 54 is connected to the collector terminal of a PNP transistor 68. The transistor can be considered a switching means. The emitter terminal of the transistor is connected to a ground terminal, and the base terminal is coupled to a source of blocking pulse signals 70 through a capacitor 72. A source of negative potential is coupled to the base terminal through an impedance 74.

The network disclosed in FIG. 1 operates as a forward shift register, and the network disclosed in FIG. 2 operates as a reverse shift register. A close examination of the two figures will reveal that the main difference between the two networks exists in the type of transistor utilized and the polarity of the blocking pulse signal required. However, the principle of operation of the network disclosed in FIG. 2 is the same as the principle of operation of the network disclosed and described in FIG. 1.

In FIG. 2, for purposes of explanation it shall be assumed that core 56 is conditioned initially to indicate the presence of a "1" and that core 50 is conditioned initially to indicate the presence of a "0." A positive potential blocking pulse signal is first fed to the PNP transistor 68 to effectively open the winding 54 circuit, and then a positive advance pulse signal is fed to the advance windings 52 and 58 to drive each of the cores to the "0" state. As the core 56 is driven from the "1" state to the "0" state the capacitor 62 receives a negative charge through the forwardly biased diode 64. The charge stored on the capacitor 62 cannot leak off as the PNP transistor 68 is cut off by the positive potential blocking pulse signal from the source of blocking pulse signals. The blocking pulse signal terminates after the advance pulse signal terminates. The transistor 68 becomes conductive to allow the passage of a signal through the winding 54, and the charge on the capacitor 62 flows through the winding 54 to switch the core 50 from "0" to "1." Obviously, if the core 56 initially indicated the presence of a "0" instead of a "1" the advance pulse signal would not have produced a charge on the capacitor 62, and core 50 would have indicated a "0" after termination of the blocking pulse signal. With reference to FIG. 1, a PNP transistor having its collector terminal grounded can be substituted for the NPN transistor 38 provided that the polarity of the bias potential fed to the base terminal is reversed. With reference to FIG. 2, in a similar manner, an NPN transistor having its collector terminal grounded can be substituted for the PNP transistor 68.

The second diode (diode 36 in FIG. 1, and diode 64 in FIG. 2) is not necessary in the basic one way shift register. However, when a number of stages which share common transistors are utilized, then the second crystal diode in each stage becomes necessary. This condition exists because the uncharged capacitors would share the energy stored in the charged capacitors through the common collector connection if the second diodes in each stage were not present.

Figure 3:
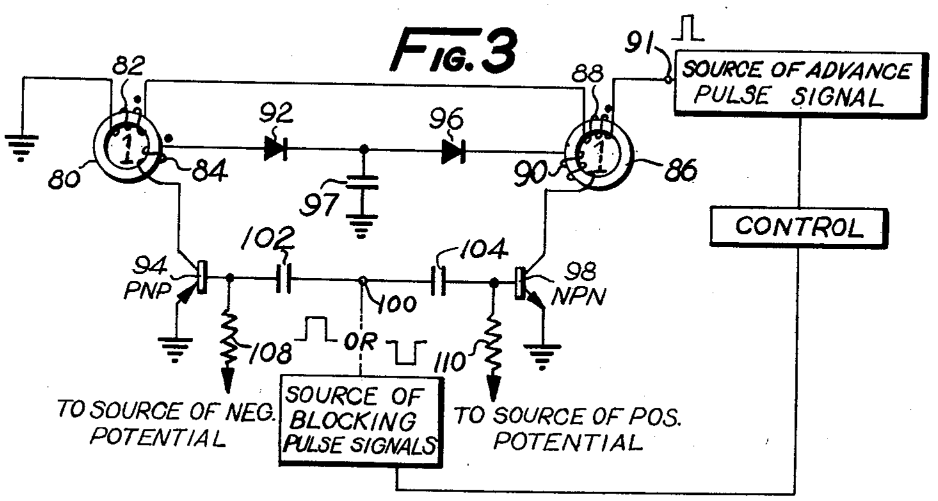
FIG. 3 is a schematic diagram of a reversible magnetic shift register utilizing the principles disclosed in FIGS. 1 and 2.

By utilizing the principles illustrated in FIGS. 1 and 2, a two way or reversible shift register can be provided. With reference to FIG. 3, a core 80 supports an advance winding 82 and a read winding 84; and a core 86 supports an advance winding 88 and a read winding 90. The advance windings 82 and 88 are connected together in series and connected between an input terminal 91 and a ground terminal. A source of advance pulse signals is coupled to the input terminal 91.

One end of the winding 84 is connected to a selective blocking means such as a diode 92, and the other end of the winding is connected to the collector terminal of a PNP transistor 94. One end of the winding 90 is connected to another selective blocking means such as a diode 96, and the other end of the winding 90 is connected to the collector terminal of an NPN transistor 98. Each of the transistors 94, 98 functions as a separate switching means. The diode 92 is connected to the diode 96 and connected to a ground terminal through an electrical storage means such as a capacitor 97. The base terminal of the transistor 94 is connected to an input terminal 100 through a capacitor 102; and the base terminal of the transistor 98 is connected to the input terminal 100 through a capacitor 104. A source of negative potential is coupled to the base terminal of transistor 94 through an impedance 108, and a source of positive potential is coupled to the base terminal of transistor 98 through an impedance 110. The emitter terminal of each transistor 94 and 98 is connected to a ground terminal. A source of blocking pulse signals capable of generating either positive or negative potential pulse signals is coupled to the input terminal 100.

In operation, the polarity of the blocking pulse signals fed to the input terminal 100 controls the mode of operation or direction of advance of the desired information.

Initially, assume that each core 80 and 86 is conditioned to indicate magnetically the presence of a "1" as illustrated in FIG. 3. To step or advance information (1's) from left to right a blocking pulse signal having a negative potential is selectively fed to terminal 100.

The application of a negative blocking pulse signal to terminal 100 cuts off the NPN transistor 98 and drives the PNP transistor 94 into heavy saturation. In this manner the transistor 94 is conditioned to facilitate the passage of signals through the winding 84, and transistor 98 is conditioned to inhibit the passage of signals through the winding 90.

The network is now conditioned to advance information from left to right. Application of an advance pulse signal to the terminal 91 generates (because of the presence of a "1" in core 80), a potential in winding 84 which causes current to flow through the PNP transistors. The flow of current through the transistor 94 places a positive charge on the capacitor 97. The capacitor retains the positive charge as long as the negative blocking pulse signal is fed to the transistor 98. After termination of the advance pulse signal, but before termination of the blocking pulse signal, each core indicates magnetically the presence of a "0," and the capacitor 97 exhibits a positive potential. Upon termination of the blocking pulse signal the transistor 98 becomes conductive and the capacitor 97 discharges through the winding 90 to drive core 86 to indicate magnetically the presence of a "1."

During operation, the cut off transistor 98 prevented potentials induced across the winding 90 by the advance pulse signal from charging the capacitor 97 negatively.

If it is desired to advance information from right to left or backwards, a positive blocking pulse signal instead of a negative blocking pulse signal is fed to input terminal 100. The operation of the shift register is the same, in principle, when information is advanced from right to left as when information is advanced left to right as explained previously.

Figure 4:
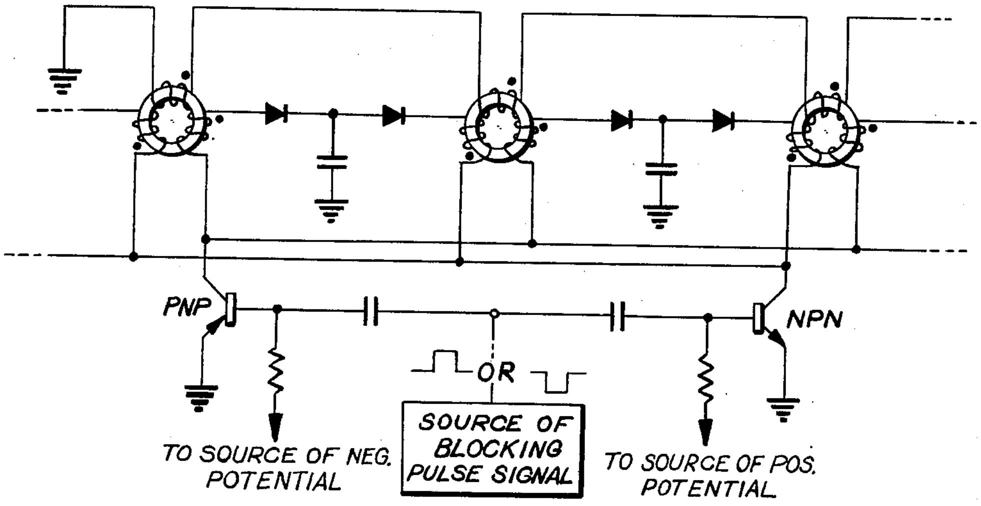
FIG. 4 is a schematic diagram of a reversible magnetic shift register in accordance with the principles of this invention illustrating the sharing of a PNP and NPN transistor by several stages.

With reference to FIG. 4, there is illustrated how a single PNP transistor and a single NPN transistor can be shared by several stages of a shift register. The collector current rating of the transistor utilized determines the number of stages that can be shared by a single transistor. However, care must be exercised to insure that the total current required for charging or discharging the capacitors is less than the total available collector current or the capacitors will not charge up to their full designed value and partial switching of the magnetic cores may result.

In some applications it may be desirable to utilize two PNP transistors or two NPN transistors instead of the NPN and PNP transistors as illustrated in FIG. 3. The network illustrated in FIG. 5 shows the arrangement where two PNP transistors are utilized in accordance with the principles of this invention.

Figure 5:
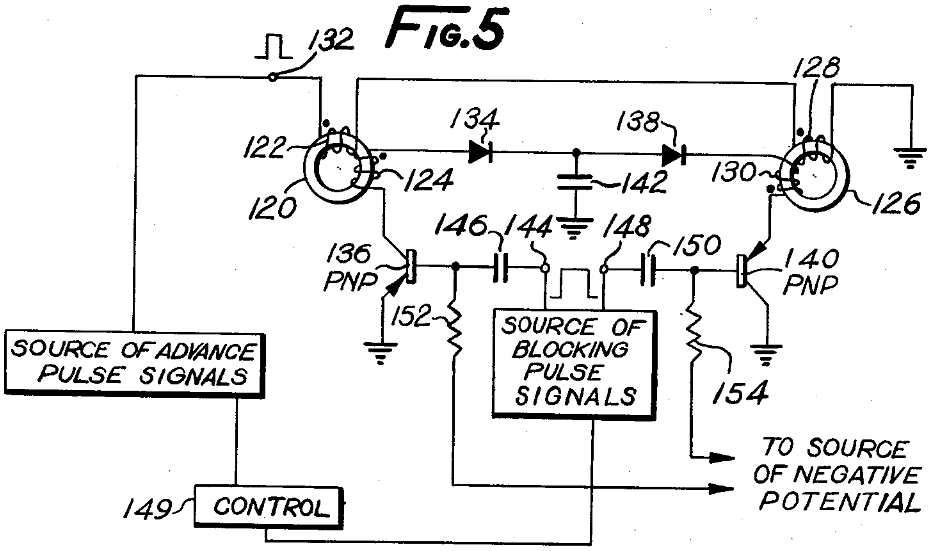
FIG. 5 is a schematic diagram of a reversible magnetic shift register in accordance with the principles of this invention illustrating how the circuit of FIG. 3 can be modified to utilize two PNP transistors instead of a PNP and an NPN transistor.

With reference to FIG. 5, a first magnetic core 120 supports an advance winding 122 and a read winding 124; and a second magnetic core 126 supports an advance winding 128 and a read winding 130. The two advance windings 122 and 128 are connected together in series and positioned between an input terminal 132 and a ground terminal. A source of advance pulse signals is coupled to the input terminal 132. One end of the winding 124 is connected to a selective blocking means such as a diode 134, and the other end of the winding 124 is connected to the collector terminal of a PNP transistor 136. One end of the winding 130 is connected to a selective blocking means such as a diode 138, and the other end of the winding 130 is connected to the emitter terminal of a PNP transistor 140. The two transistors operate as switching means. The two selective blocking means such as the diodes 134 and 138, are each coupled to a ground terminal through an electrical storage means such as a capacitor 142. The base terminal of the transistor 136 is connected to an input terminal 144 through a capacitor 146; and the base terminal of the transistor 140 is connected to an input terminal 148 through a capacitor 150. A source of blocking pulse signals is coupled to feed a signal to input terminal 144 or 148. A source of negative potential is coupled to the base terminals of transistors 136 and 140 through impedances 152 and 154 respectively. The emitter terminal of the transistor 136 and the collector terminal of the transistor 140 are each connected to a ground terminal.

In operation, the network illustrated in FIG. 5 advances information from left to right, or in a forward direction when a positive blocking pulse signal is fed to input terminal 148; and advances information from right to left, or in a reverse direction when a positive blocking pulse signal is fed to input terminal 144. However, in either mode of operation the transistor which is not cut off should receive sufficient base current to allow saturation.

Highly successful operation of the network disclosed was obtained when the technique of pulse bracketing was utilized. Basically, this means that the blocking pulse signal is initiated before the advance pulse signal is initiated, and that the blocking pulse signal terminates after the advance pulse signal terminates. Thus it can be stated that the time of occurrence of the advance pulse signal lies within the time of occurrence of the blocking pulse signal.

A control means 149 is provided to insure accurate timing of the advance pulse signals relative to the blocking pulse signals.

Figure 6:
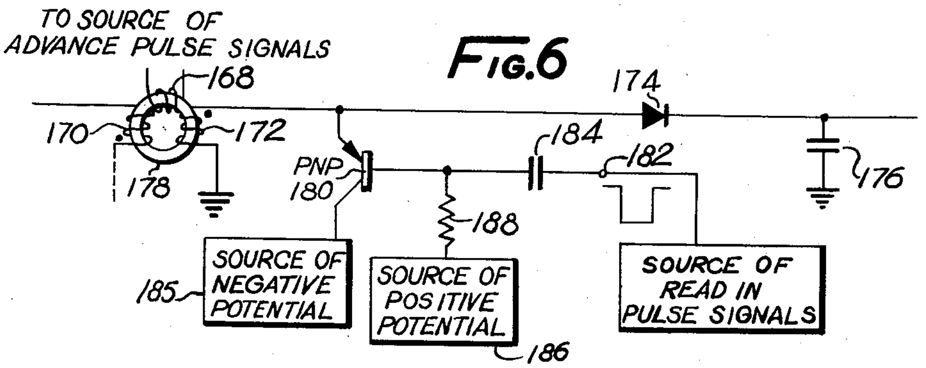
FIG. 6 is a schematic diagram illustrating an improved read-in network for a magnetic shift register.

While it is important to provide a magnetic core shift register which can selectively advance desired information, it is equally important to provide structure that can selectively insert or feed a "1" into a magnetic core shift register from an external source. FIG. 6 illustrates a novel read-in network operating into a magnetic core shift register, a portion of which is shown. This read-in network can selectively feed desired information into a magnetic core shift register without requiring the use of an additional or special read-in winding. However, it is to be understood that the utilization of this read-in network is not restricted to this one particular type of application.

With reference to FIG. 6, the emitter terminal of a PNP transistor 180 is connected to the point common to the winding 172 and the diode 174. The collector terminal of the transistor is coupled to a source of negative potential 185, and the base terminal of the transistor is coupled to an input terminal 182 through a capacitor 184. A source of positive potential 186 is coupled to the base terminal of the transistor through an impedance 188. The transistor functions as a switching means. A source of negative potential read-in pulse signals is selectively energized to feed a pulse signal of sufficient magnitude to the terminal 182 to saturate the transistor 180.

In operation, the transistor 180 is normally biased to its cut off condition. To insure the existence of the cut off condition, the magnitude of the output signal from the source of positive potential 186 is larger than the peak potential which can be stored in the capacitor 176 when the advance pulse signal is fed to the advance winding 168. At a predetermined instant, the source of negative potential read-in pulse signals is activated and a pulse signal is fed through the input terminal 182 and the coupling capacitor 184 to the base terminal of the transistor 180. The read-in pulse signal saturates the transistor to permit the negative potential fed to the collector terminal to be passed to the read winding 172. This passed signal switches the core 178 to indicate the presence of a "1." The output impedance of the saturated transistor limits the current after the core is switched, but an additional current limiting impedance can be coupled to the emitter or the collector circuit to limit the magnitude of the current that flows through the winding 172. When the transistor is in a saturated state, the negative potential fed to the collector terminal and passed through the transistor biases the diode 174 to its off condition to prevent the capacitor 176 from charging negatively during read-in.

An NPN transistor can be substituted for the PNP transistor 180 provided proper bias voltages are utilized; the emitter of the NPN transistor is connected to the undotted terminal of the winding 170; and the read-in pulse signal fed to the terminal 182 has a positive polarity.

Figure 7:
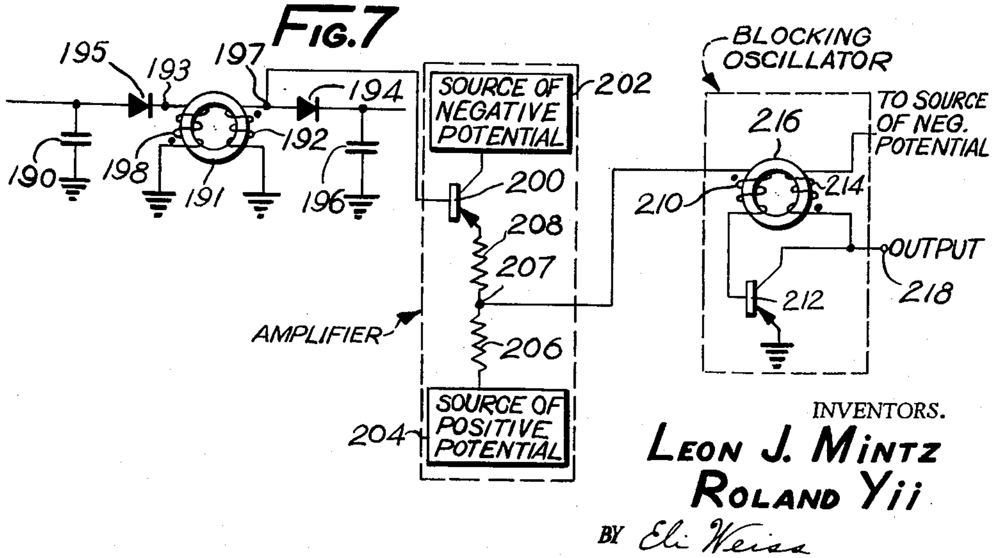
FIG. 7 is a schematic diagram illustrating an improved read-out network for a magnetic shift register.

FIG. 7 illustrates a novel read-out network for operation in combination with a magnetic core shift register, a portion of which is shown. This read-out network can detect or read-out desired information from a magnetic core shift register without requiring the use of an additional or special read-out winding. With reference to FIG. 7, the point common to the read winding 192 and the diode 194 is connected to the base terminal of a PNP transistor 200. The collector terminal of the transistor is connected to a source of negative potential 202; and the emitter terminal is coupled to a source of positive potential 204 through an impedance 206 connected in series with an impedance 208. The point 207 common to the two impedances 206 and 208 is coupled to feed a signal through a first winding 210 on a core 216 to the base terminal of a PNP transistor 212. The emitter terminal of the transistor 212 is connected to a ground terminal, and the collector terminal of the transistor 212 is connected to a second winding 214. An output terminal 218 is connected to the collector terminal of the transistor 212.

The transistor 200 operates as an amplifier; and the two windings 210 and 214 coupled to core 216, in combination with the transistor 212 operate as a blocking oscillator.

In operation the blocking oscillator is normally conditioned to its cut off state. When the capacitor 190 discharges through the winding 198 to condition the core 191 to a "1," the potential induced across the winding 192 goes negative. However, since diode 194 is biased to its cut off condition, the current which flows through the winding 192 must originate from the transistor 200. As the base potential of this transistor drops the emitter potential drops. A negative pulse is thus applied to the base of transistor 212 through winding 210 on core 216. Transistor 212 is thereby rendered conductive to produce an output pulse at terminal 218. At the same time, current passes through winding 214 of core 216, entering at the dotted end, and induces a voltage in winding 210, which, according to the dotted notation illustrated, would be negative at the end of winding 210 connected to the base of transistor 212. Thus, it will be seen that winding 214 is regeneratively coupled with respect to winding 210 and transistor 212, such that as soon as transistor 212 is triggered to conduct, the voltage generated in winding 210 will maintain transistor 212 conductive until the core 216 magnetically saturates. When core 216 saturates, no voltage will be induced in winding 210 to apply the negative bias to the base of transistor 212, and the transistor will then cease to conduct.

It is thus seen that core 216 and transistor 212 form a blocking oscillator which will be triggered when an output pulse appears at point 197, the blocking oscillator in turn producing an output pulse at point 218 which will be of a duration depending upon the parameters of core 216 and transistor 212, and not upon the duration of the output pulse at point 197.

The same principle of operation can be utilized to provide a read-out circuit for reverse shift operation. Two NPN transistors can be substituted for the two PNP transistors 200 and 212 illustrated provided proper biases are utilized in the amplifier and blocking oscillator. In this instance the read-out terminal will be located at the point 193 common the winding 198 and diode 195. The blocking oscillator can be fired directly by the switching core without the amplifier stage if additional energy is stored in the capacitor 190. The major purpose of the amplifier stage is to protect the core from being heavily loaded by the blocking oscillator. When the core is switched by the energy stored in the capacitor the high input impedance of the emitter follower draws very little current through the winding 198 to reduce the loading effect.

It is not necessary that the blocking oscillator be activated during the time interval when the capacitor is discharging; it can be designed to be activated when the capacitor is being charged, or even during the read-in time interval.

The cut off bias for the blocking oscillator from the voltage divider 206, 208 should be large enough to prevent the activation of the blocking oscillator by the occurrence of "noise pulses" at points 193 and 197. The term "noise pulse" used here actually has a meaning different from its ordinary usage. It can be defined as follows: Assume that a core is at one of its stable states. Application of a pulse signal that has a polarity that drives the core further into saturation will generate a noise pulse signal.

In a reversible shift register, the read-out networks, one for the forward shift and the other for the reverse shift, can be utilized. However, unless gates are utilized to select the proper read-out network, false results will be generated as the forward read-out network will respond to the reverse shift signal and the reverse read-out network will respond to the forward shift signal.

If the capacitor stores more energy than is required to switch the core from the "0" state to the "1" state the emitter followers, amplifiers, can be omitted if the emitter of the blocking oscillator transistor is biased properly for a normally cut off condition. In this instance, a suitable resistor can be inserted in the base circuit of the blocking oscillator to reduce the loading effect of the core and to limit the magnitude of the collector current.

If the positive and negative pulse signals that appear across the capacitor are detected by a transistor amplifier that does not drain an excessive charge from the capacitor, then the blocking oscillator can be eliminated.

The shift register can be cleared of all information by one of a number of methods. In one method, an additional winding can be positioned around each magnetic core and all of the windings connected together in either series or parallel. Application of a strong current or voltage pulse signal to the windings will switch all of the cores to a "0" state and clear the register. In another method an additional advance pulse signal can be fed to the advance windings of the register while a blocking pulse signal is not applied to cut off the blocking transistors. This procedure will also switch all of the cores to a "0" state and clear the register. In this last instance, the output energy of each core will leak through the blocking transistor without switching the core that follows if the advance pulse signal is wide enough to over-ride the energy transferred which tends to switch the core to indicate a "1."

Figure 8:
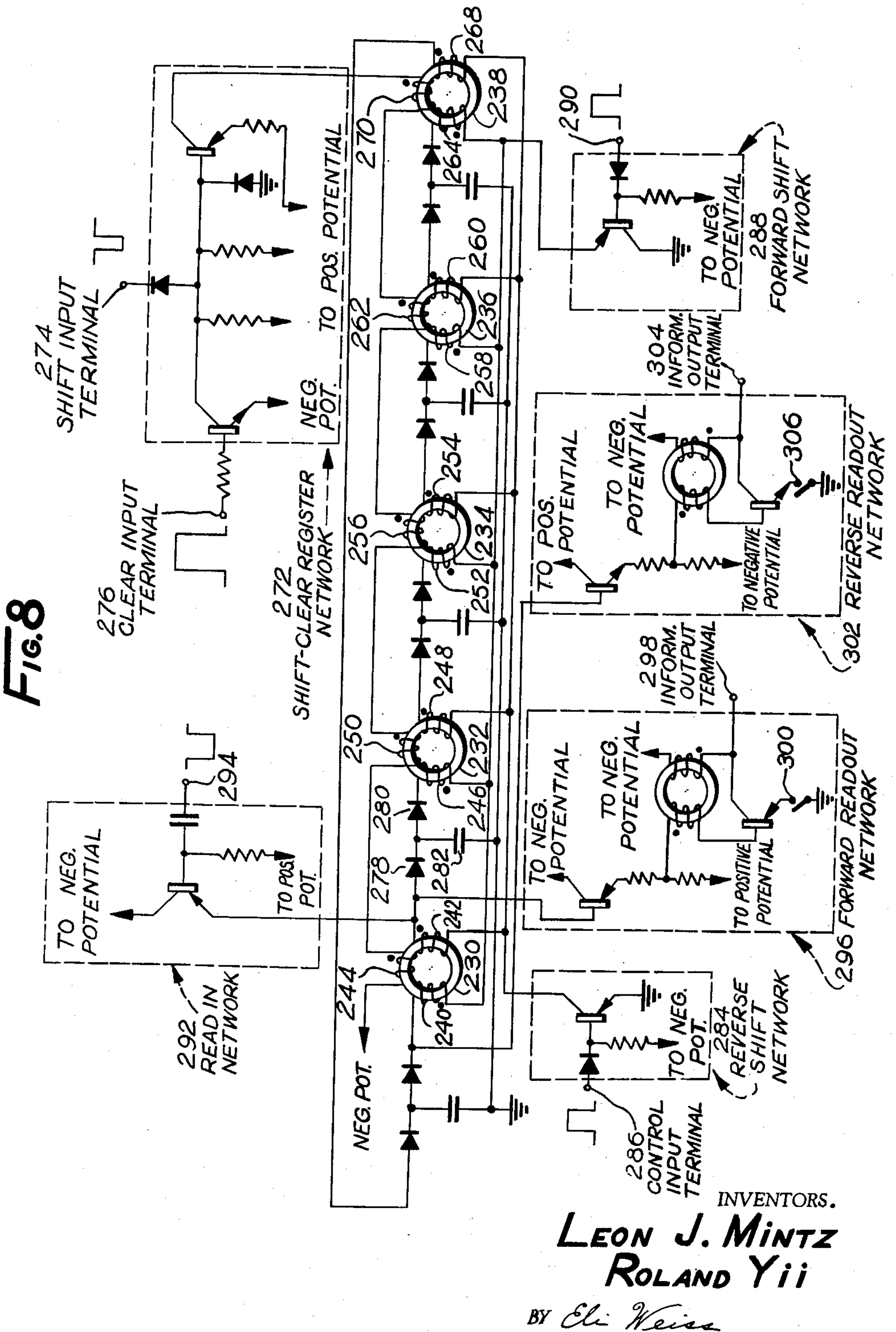
FIG. 8 is a schematic diagram of a reversible magnetic shift register in accordance with the principles of this invention.

With reference to FIG. 8, there is illustrated schematically a reversible shift register in accordance with the principles of this invention. This figure illustrates a five core shift register for convenience only. However, it is to be understood that this invention is not restricted to a shift register that utilizes five cores, but can have an increased or decreased number of magnetic cores.

In FIG. 8, five magnetic cores 230, 232, 234, 236 and 238 each supports an advance winding and two read windings. Core 230 supports two read windings 240 and 242 and an advance winding 244; core 232 supports two read windings 246 and 248 and an advance winding 250; core 234 supports two read windings 252 and 254 and an advance winding 256; core 236 supports two read windings 258 and 260 and an advance winding 262; and core 238 supports two read windings 264 and 268 and an advance winding 270. The advance windings 244, 250, 256, 262 and 270 are connected in series and coupled to a shift-clear register network 272 that supports a shift input terminal 274 and a clear input terminal 276. One end of each of the two windings 242 and 246 is connected together through two selective blocking means such as crystal diodes 278 and 280; and an electrical storage means such as a capacitor 282 is interposed between the junction of the two diodes and a ground terminal. A similar arrangement is present between the windings 248 and 252; 254 and 258; 260 and 264; and 268 and 240. The other end of each of the windings 242, 248, 254, 260 and 268 is connected to a reverse shift network 284 which supports a control input terminal 286; and the other end of each of the windings 246, 252, 258, 264 and 240 is connected to a forward shift network 288 which supports a control input terminal 290. A read-in network 292 and a forward read-out network 296 are connected to the point common to the winding 242 and the diode 278. The read-in network 292 supports an input terminal 294; and the forward read-out network 296 supports an information output terminal 298 and a control terminal 300. A reverse read-out network 302 is coupled to the winding 240 and supports an information output terminal 304 and a control terminal 306. Each of the control terminals 300 and 306 is connected to a ground terminal through an electronic or mechanical switch.

With reference to the forward read-out network 296, information can appear on the information output terminal 298 only when the control terminal 300 is connected to a ground terminal. The reverse read-out network 302 operates in a manner similar to the operation of the forward read-out network.

In operation, information is fed into the shift register in the form of a "1" by selectively feeding a negative potential pulse signal to the input terminal 294 of the read-in network 292. A negative pulse input signal will condition the core 230 to indicate the presence of a "1." Information in the shift register is advanced in a forward direction (left to right) by feeding a negative potential pulse signal to the shift input terminal 274 of the shift-clear register network 272 during the occurrence of a positive potential pulse signal at the control input terminal 290 of the forward shift network 288. A control means insures the proper time relationship between the blocking pulse signal and the advance or shift pulse signal.

Information in the shift register can be advanced in a reverse direction (right to left) by feeding a negative potential pulse signal to the shift input terminal 274 of the shift-clear register network 272 during the occurrence of a positive potential pulse signal at the control input terminal 286 of the reverse shift network 284. During forward shift mode of operation, information can be read out of the shift register by connecting the control terminal 300 of the forward read-out network 296 to a ground terminal. The output information will appear at the information output terminal 298. In a like manner, during reverse shift mode of operation, information can be read out of the shift register by connecting the control terminal 306 of the reverse read-out network 302 to a ground terminal. In this instance, the output information will appear at the information output terminal 304.

Information stored in the shift register is removed by feeding a positive potential pulse signal to the clear input terminal 276 of the shift-clear register network 272.

Obviously, many modifications and variations of the present invention are possible in the light of the above teachings. It is therefore to be understood that within the scope of the appended claims the invention may be practiced otherwise than as specifically described.

What is claimed is:

1. In a shift register including a pair of magnetic cores each having at least one winding and each capable of storing information by assuming one of two states of remanence in response to electrical pulses applied to said windings; means for placing one of said cores in one state of remanence representative of stored information; means for applying an advance signal simultaneously to both cores to advance the information stored in said one core to the other core; a transfer circuit interconnecting said two windings for effecting said advance; said transfer circuit comprising a capacitor for temporarily storing the transferred information, a capacitor charging circuit including a unidirectional conductive device operatively connected to charge said capacitor from said winding of said one core, and a capacitor discharging circuit operatively connected to said winding of said other core; the improvement wherein said capacitor discharging circuit comprises a transistor having an emitter, collector and base, and wherein said capacitor is connected in series with said winding of said other core, the transistor emitter and the transistor collector; said base being normally biased to render said emitter and collector circuit conductive and thereby tending to cause the discharge of said capacitor; and means for applying a blocking pulse to said transistor base simultaneously with the application of the advance signal, said blocking pulse being effective to render said emitter and collector circuit non-conductive and thereby to prevent capacitor discharge, said blocking pulse terminating after the termination of said advance signal to effect capacitor discharge through said series connected transistor emitter, transistor collector and said winding of said other core.

2. In a shift register including a pair of storage elements each capable of storing information by assuming a first and second stable condition in response to applied electrical pulses; means for applying an informational pulse to one of said storage elements to place it in one of said stable conditions to represent stored information; means for applying an advance signal to both of said elements simultaneously to advance the information stored in said one storage element to the other storage element; a transfer circuit interconnecting said two storage elements; said transfer circuit comprising a capacitor for temporarily storing the transferred information, a capacitor charging circuit operatively connected to said one storage element, and a capacitor discharging circuit operatively connected to said other storage element; the improvement wherein said capacitor discharging circuit comprises a signal translating device having a pair of input electrodes and a control electrode, and wherein said capacitor is connected in series with said other storage element and said pair of input electrodes; said control electrode being biased to render said input electrodes conductive and thereby to discharge said capacitor; said shift register further including means for applying a blocking pulse to said control electrode simultaneously with the application of the advance signal; said blocking pulse being effective to over-ride said control electrode bias and thereby to prevent capacitor discharge; said blocking pulse terminating after the termination of said advance signal to effect capacitor discharge through said series connected circuit including said pair of input electrodes and said other storage element.

3. A shift register comprising a first and second storage magnetic core each capable of assuming a first and second state of remanence to represent information stored therein; each of said cores including at least one winding thereon; a transfer circuit for advancing information from one core to the other; said transfer circuit comprising a capacitor, a unidirectional conductive device, and a transistor having an emitter, collector and base; said transfer circuit further including circuit connections connecting said first core winding in series with said capacitor and said unidirectional conductive device with the latter device poled to permit said capacitor to charge when a voltage is generated in said first core winding during read-out of information from said first core; said transfer circuit further including circuit connections connecting said second core winding in series with said capacitor and the emitter and collector of said transistor such to permit said capacitor to discharge through said second core winding; means for applying an advance signal simultaneously to both cores to effect a transfer of the information stored in said first core to said second core; means for biasing said transistor base to render conductive the circuit through the emitter and collector of said transistor; and means for applying a blocking pulse to said transistor base simultaneously with the application of the advance signal to cut off said transistor from conduction during the application of the advance signal, said blocking pulse terminating after the termination of the advance signal to resume conduction through said transistor and thereby to effect capacitor discharge through said series connected transistor emitter, transistor collector and said second core winding.

4. A shift register as defined in claim 3, wherein said first and second magnetic cores each includes a second winding thereon, and wherein the advancing signals applied simultaneously to both cores are applied to said second windings.

5. A shift register as defined in claim 3, wherein said transfer circuit includes a second unidirectional conductive device connected in series with said capacitor, said second core winding, the transistor emitter and the transistor collector, and wherein said second unidirectional conductive device is poled to permit said capacitor to discharge through said second core winding.

6. A shift register as defined in claim 5, wherein said transfer circuit is reversible and includes a second transistor having an emitter, collector and base, said transfer circuit further including circuit connections connecting said first core winding in series with the emitter and collector of said second transistor such to permit said capacitor to also discharge through said first core winding; said shift register further including means for biasing said second transistor base to render conductive said circuit through the emitter and collector of said second transistor; means for applying a blocking pulse to said second transistor base simultaneously with the application of the advance signal to cut off said second transistor from conduction during the application of said advance signal, said blocking pulse terminating after termination of the advance signal to render said second transistor conductive and thereby to effect capacitor discharge through said series-connected second transistor emitter, second transistor collector and said first core winding; and means for controlling the application of the blocking pulse selectively to one or the other of said first or second transistor bases, whereby to control the transfer of the information from the first core to the second core, or from the second core to the first core.

7. A shift register having a plurality of stages connected in cascade, each stage being as defined in claim 6, said shift register further including circuit means connecting said first-mentioned transistor in common with all said second core windings so as to control the transfer of information in the forward direction, and further circuit means connecting said second transistor in common with all said first core windings so as to control the transfer of information in the reverse direction.

8. A shift register as defined in claim 5, further including a read-in circuit for one of said cores, said read-in circuit comprising a read-in transistor having an emitter, collector and base, means for connecting said first core winding to the emitter and collector circuit of said read-in transistor, and means for connecting said read-in transistor base to a source of read-in signals.

9. A shift register as defined in claim 5, further including a read-out circuit for reading out information from one of said cores, said read-out circuit comprising a read-out core and a read-out transistor, said read-out core including a first and second winding and said read-out transistor including an emitter, collector and base, circuit means connecting said read-out core first winding to one of said storage core windings and to the base of said read-out transistor such to bias the transistor into a conductive state when an informational pulse is being read out from the storage core, further circuit means connecting the read-out core second winding to the emitter and collector circuit of the read-out transistor such to receive current when the transistor is conductive, the read-out core second winding being disposed in a regenerative coupling relationship with respect to said read-out core first winding such to maintain conductivity in the read-out transistor until the read-out core has been magnetically saturated.

10. A shift register as defined in claim 9, wherein said circuit means connecting said read-out core first winding to one of said storage core windings includes a transistor amplifier for amplifying the output informational pulse from said storage core winding.

References Cited in the file of this patent

UNITED STATES PATENTS

| | | |
|---|---|---|
| 2,825,890 | Ridler et al. | Mar. 4, 1958 |
| 2,846,669 | McMillian et al. | Aug. 5, 1958 |
| 2,863,138 | Hemphill | Dec. 2, 1958 |
| 2,872,663 | Kelner et al. | Feb. 3, 1959 |
| 2,876,438 | Jones | Mar. 3, 1959 |
| 2,913,598 | Torrey | Nov. 17, 1959 |
| 2,945,135 | Wilhelmsen | July 12, 1960 |
| 2,946,987 | Townsend | July 26, 1960 |

FOREIGN PATENTS

| | | |
|---|---|---|
| 730,165 | Great Britain | May 18, 1955 |